United States Patent [19]

Wu et al.

[11] Patent Number: 5,405,895
[45] Date of Patent: Apr. 11, 1995

[54] SURFACE TREATING COMPOSITIONS AND METHODS OF PREPARATION AND USE IN TREATING LONG GLASS FIBERS

[75] Inventors: Jeng-Yue Wu, Tainan; Chih-Cheng Chiang, Chung-Li; Jiunn-Chern Hou; Rong H. Chang, both of Hsinchu, all of Taiwan, Prov. of China

[73] Assignee: Industrial Technology Research Institute, Hsinchu,

[21] Appl. No.: 922,920

[22] Filed: Jul. 30, 1992

[51] Int. Cl.⁶ .............................................. C08K 5/20
[52] U.S. Cl. .................................. 524/188; 524/494; 523/209
[58] Field of Search ................. 520/209; 524/188, 494

[56] References Cited

U.S. PATENT DOCUMENTS

| | | | |
|---|---|---|---|
| 2,133,238 | 10/1938 | Slayter et al. | 117/52 |
| 2,252,555 | 8/1941 | Carothers et al. | 260/78 |
| 3,336,415 | 8/1967 | Kennedy | 260/831 |
| 3,462,337 | 8/1969 | Gorton | 156/330 |
| 3,636,136 | 1/1972 | Konopik | 260/857 L |
| 3,637,550 | 1/1972 | Sprauer | 260/18 |
| 3,862,287 | 1/1975 | Davis | 264/131 |
| 4,246,145 | 1/1981 | Molinier et al. | 525/113 |
| 4,248,935 | 2/1981 | Temple | 428/391 |
| 4,273,694 | 6/1981 | Pepe et al. | 524/188 |
| 4,358,501 | 11/1982 | Temple | 428/268 |
| 4,369,264 | 1/1983 | Baumann et al. | 523/209 |
| 4,413,085 | 11/1983 | Temple | 524/321 |
| 4,439,387 | 3/1984 | Hawley | 264/108 |
| 4,439,558 | 3/1984 | Tamosauskas et al. | 523/217 |
| 5,090,405 | 2/1992 | Jansen et al. | 524/188 |

FOREIGN PATENT DOCUMENTS 885001  2/1981  Belgium .

OTHER PUBLICATIONS

Elvamide ®: Product and Properties Guide, DuPont (1990).
J. A. Hubbell et al. (1986) *Biomaterials,* vol. 7(5), pp. 354–363 (Derwent Abstract).
JP 3113075, Published May 14, 1991 (Derwent Abstract).
Dialog Search Results (Jun. 22, 1992).

*Primary Examiner*—Kriellion S. Morgan
*Attorney, Agent, or Firm*—Darby & Darby

[57] ABSTRACT

A surface treating composition for treating long glass fibers for use in making long fiber-reinforced resin composites and methods for preparation and use thereof are provided. The surface treating compositions comprise (i) a wetting agent in an amount ranging between about 3 and about 40 wt. %, said wetting agent having a formula:

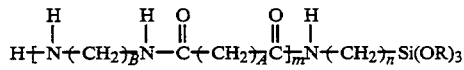

and

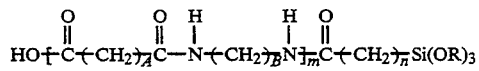

wherein A=4–12; B=2–10; n=2–6; m=20–40; and R=CH$_3$ or C$_2$H$_5$; and a thermoplastic resin in an amount ranging between about 1 and about 40 wt. %, said thermoplastic resin is selected from the group consisting of polyamide polymers, polyamide copolymers, polyalkylcarbonate polymers, polyalkylcarbonate copolymers, and mixtures thereof. Reinforced thermoplastic composites having the treated glass fiber have excellent mechanical and uniform fiber dispersibility properties.

16 Claims, No Drawings

SURFACE TREATING COMPOSITIONS AND METHODS OF PREPARATION AND USE IN TREATING LONG GLASS FIBERS

FIELD AND BACKGROUND OF THE INVENTION

In the manufacture of glass fiber reinforced thermoplastic resins, glass fibers are generally pretreated with sizing and coupling agents as a means for improving the adhesive strength between the fiber and thermoplastic polymers. Without effective coupling between the glass fiber and the resin, the adhesion between the two will be weak and separation will occur under shear or tensile stresses.

Methods which employ compositions for treating chopped strands for use in short-fiber reinforced thermoplastic resin pellet manufacture are known in the art. For example, U.S. Pat. Nos. 4,369,264, 4,439,558, BE 885,001 describes emulsions of vinyl coupling agents, stable organic peroxides and film forming agents; U.S. Pat. Nos. 4,248,935, 4,358,501, 4,413,085 discloses sizing compositions of aminosilane coupling agents, non-crosslinkable film forming polymers, and anhydride stabilizer agents. When such compositions are employed in treating long glass fibers for use in long fiber reinforced thermoplastic (LFRTP) pellets, the treated glass fibers do not uniformly disperse during the injection molding process due to overly strong adhesion between fiber and resin interface.

Specific methods for treating long glass fibers for use in the preparation of long fiber reinforced thermoplastics have been reported. For example, U.S. Pat. No. 3,862,287 describes a process for the manufacture of long fiber reinforced thermoplastic pellets (Verton®, ICI Corporation), wherein single strands of fibers are passed into a fluidized bed of thermoplastic resin powder. The impregnated fibers are then heated to the melting point of the thermoplastic so that the fiber becomes embedded in the melted thermoplastic matrix. U.S. Pat. No. 4,439,387 describes a method of preparing long fiber reinforced thermoplastic articles (Celstran®, PCI Corporation, U.S.A.) involving co-extrusion of glass fiber and resin through a special die so as to wet the fiber with the molten resin. These methods, however, suffer from a number of deficiencies which include the use of multiple processing steps and expensive specialized equipment. Accordingly, there is a need in the art for a simple, economical method and composition for treating long glass fibers for use in making long fiber-reinforced resin composites and which avoids at least certain of the aforementioned deficiencies.

SUMMARY OF THE INVENTION

The present invention relates to a surface treating composition and method for treating glass fiber used for long fiber-reinforced thermoplastic materials, treated glass fibers and thermoplastic articles containing the treated glass fibers.

The surface treating composition of the present invention comprise an organic wetting agent and thermoplastic polymer. The organic wetting agent is a multifunctional organosilicon compound having the formula:

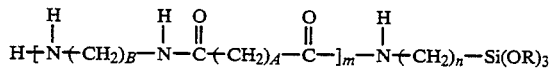

or

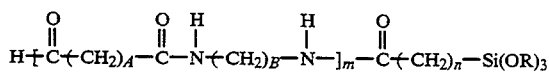

wherein A=4–12; B=2–10; n=2–6; m=20–40; and R=$CH_3$ or $C_2H_5$.

The thermoplastic resin is a member selected from the group consisting of polyamide polymers, polyamide copolymers, polyalkylcarbonate polymers, polyalkylcarbonate copolymers, and mixtures thereof. The preferred thermoplastic resins for use in the invention are polyamide resins having the formula:

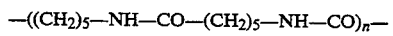

or

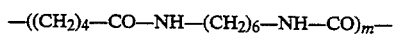

wherein n and m=130 to 220.

The organic wetting agent is present in the surface treating composition in an amount ranging between about between about 3 and about 40 wt. %, preferably ranging between about between about 5 and about 20 wt. %. The thermoplastic resin is present in the composition in an amount ranging between about 1 and about 40 wt. %, preferably ranging between about 5 and about 25 wt. %.

Treatment of commercially used long glass fibers, e.g. glass rovings, with the surface-treating composition of the invention results in long fiber reinforced thermoplastic pellets having excellent mechanical properties and uniform fiber dispersion.

DETAILED DESCRIPTION OF THE INVENTION

All patents, patent applications, and literature references cited in the specification are hereby incorporated by reference in their entirety.

It has been discovered that long glass fiber reinforced thermoplastic articles having improved mechanical properties and uniform fiber dispersion are obtained by treating commercially used long glass fibers, e.g glass rovings, with a surface treating composition comprising an organosilicon wetting agent and a thermoplastic resin. The surface treating composition of the invention uniformly wets the glass fiber surface, imparts a good interfacial adhesive force between the fiber and the resin, and allows for uniform dispersal of glass fiber during the injection molding process so as to not affect the appearance of the product.

The organosilicon wetting agent employed in the surface treating composition of the invention is a multifunctional organosilicon compound having the formula:

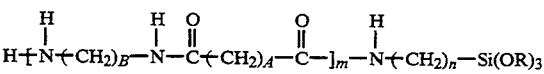

or

-continued

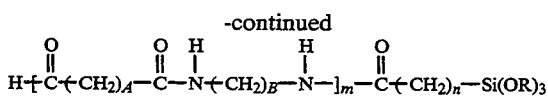

wherein A=4–12; B=2–10; n=2–6; m=20–40; and R=CH$_3$ or C$_2$H$_5$.

The thermoplastic resin of the surface treating composition is a member selected from the group consisting of polyamide polymers, polyamide copolymers, polyalkylcarbonate polymers, polyalkylcarbonate copolymers, and mixtures thereof. A particularly preferred thermoplastic resin for use in practicing the invention is a polyamide which includes polyamide-6 (e.g. Nylon-6) preparable by the polymerization of caprolactam, and polyamide-6,6 (commonly called Nylon-6,6) preparable by the condensation polymerization of hexamethylene diamine and adipic acid. These thermoplastic polyamide resins have the formula:

—(—(CH$_2$)$_5$—NH—CO—(CH$_2$)$_5$—NH—CO—]$_n$— or

—(—(CH$_2$)$_4$—NH—CO—(CH$_2$)$_6$—NH—CO—]$_m$— wherein n and m=130 to 220.

The thermoplastic resin generally have a relative viscosity ranging between about 2.5 and about 4.0, preferably about 3.4, at a temperature of 23° C. The thermoplastic resin is preferably particulate and has a particle size ranging between about 0.2 microns and about 20 microns, preferably about 1 micron.

The organic wetting agent is present in the surface treating composition in an amount ranging between about between about 3 and about 40 wt. %, preferably ranging between about between about 5 and about 20 wt. %. The thermoplastic resin is present in the composition in an amount ranging between about 1 and about 40 wt. %, preferably ranging between about 5 and about 25 wt. %.

U.S. Pat. No. 3,637,550 (the '550 patent) describes methods for the preparation of the organic wetting agent (thermoplastic silanated polyamides) from polyamide resins. These thermoplastic silanated polyamides are hygroscopic; alcohol soluble; have low melt processing temperatures broadly ranging between about 105° C. and about 160° C., preferably between about 145° C. and about 160° C.; have relative viscosities (8.4 wt. % polyamide in 90 % formic acid solution at 25° C.) ranging between about 21 and about 110, preferably between about 24 and about 36; have specific gravities (23° C.) ranging between about 1.05 and about 1.20, preferably ranging about 1.05; and are usable in solvent as well as melt systems.

The preparation of polyamides useful in preparing the organic wetting agents of the invention is known in the art. These polyamides must contain at least 3 different recurring polyamide repeat units. By "polyamide repeat unit" is meant a polymer unit of the structure

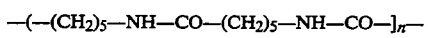

in which A and B are the same or different hydrocarbylene groups. This means that the polyamide must be derived from at least 3 and usually at least 4 different polyamide-forming monomers.

The crystalline melting point of the polyamide can be adjusted or selected within limits to suit the need. The melting point of a given polyamide is dependent upon the particular monomers from which it is derived. The crystalline melting point of the polyamides used herein should be below about 230° C., in order to retain processing advantages, and in some cases is advantageously below about 190° C. The melt index of the polyamides used herein must be at least about 0.1 to provide processability, and less than about 2,000, and preferably less than about 200, in order to provide adequate strength and toughness. The preferred products have a melt index of about 1 to 100.

A preferred class of polyamides for use in the invention includes those containing repeat units derived by weight about 0 to 45 percent from the condensation of hexamethylene diamine and adipic acid, about 0 to 65 percent from the condensation of hexamethylene diamine and a polymethylene diacid of 10 to 12 carbons, and about 20 to 75 percent from 6-aminocaproic acid. These polyamides having melting points of less than about 170° C.

A particularly preferred class of polyamides includes those containing repeat units derived by weight about 0 to 35 percent from the condensation of hexamethylene diamine and adipic acid, about 5 to 50 percent from the condensation of hexamethylene diamine and polymethylene diacid of 10 to 12 carbons, and about 25 to 65 percent from 6-aminocaproic acid. These preferred polyamides having melting points of less than about 150° C.

Suitable methods of preparing polyamides are well known to those skilled in the art. For example, the preparation of polyamides by melt condensation is described in U.S. Pat. No. 2,252,555. The reaction is carried out by heating diacid, diamine and/or amino acid, or their polyamide-forming derivatives, at temperatures of about 150° C. to 300° C., while driving off water, and continuing the reaction until the desired molecular weight is obtained. The functional groups at the end of the polymer chain will be carboxylic acid and amine, one of which may be in slight excess depending upon which reactant was present in excess.

The silanated terpolymer wetting agents used in the invention may be made by any known process, e.g., that described in the '550 patent. Generally about 0.1 to 3 wt. % of the silanating agent is dry blended with the polyamide at a temperature above the melting point of the polymer preferably in the presence of a minimum amount of moisture. The preferred amount is about 0.5 to 1.5%.

The silanating compound contains an oxy-silylene-hydrocarbylene group and has the oxy groups directed attached to alkyl or alkoxyalkyl, and the hydrocarbylene group directly attached to a functional group which is more chemically reactive with the polyamide then the oxy-silylene group. Preferably, the functional group is an amine, an alkoxy carbonyl group, or an oxirane group. Such compounds are of the general formula

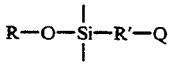

where R is alkyl or alkoxyalkyl, R' is hydrocarbylene selected from the group consisting of saturated alphatics, saturated alicyclics, and aromatics of 2 to 40 carbon atoms, and Q is a radical selected from the group consisting of amine, oxirane, alkoxycarbonyl, carboxyl, hydroxyl, aldehyde, amide, anhydride, carbamate, isocyanate, isocyanide, isothiocyanate, isothiourea, ketoxime, lactide, mercapto, oxime, ozonide, peroxide, thiol, thiocyanate and ureido.

Preferably, the additional valences of the Si are satisfied by additional O—R groups, in which case the silanating compound is of the formula $(RO)_3$—Si—$R^1$—Q, but they may also be satisfied by hydrogen or hydrocarcarbyl. Correspondingly, where Q is amine radical, one of the amine hydrogens may be substituted by alkyl or one or both of the amine hydrogens may be substituted by aminoalkyl or hydroxyalkyl. Examples of specific silanating agents are set forth in the '550 patent and in the references cited therein.

The oxy-silylene-hydrocarbylene groups of the silanating compound are bounded through the hydrocarbylene radical to an oxygen, nitrogen or carbon atom of the polyamide, and are attached directly to alkyl or alkoxyalkyl at the oxy group. The exact proportion of oxy-silylene-hydrocarbylene groups to polyamide is not highly critical. These hydrocarbylene groups contain 2 to 40 and generally 2 to 10 carbon atoms.

In preparing the surface treating composition of the present invention, the organic wetting agent and thermoplastic resin are mixed together with a solvent at a temperature ranging between about 35° C. and about 80° C., preferably about 60° C., for a time period ranging between about 5 minutes and about 120 minutes, preferably about 30 minutes. The pH of the dispersion generally ranges between about 6 and about 8, preferably about 7.

The selection of a solvent or solvent system for formulating and applying the treating composition containing the wetting agent is important in practicing the invention. In general, the preferred choice of a solvent or solvent system is one that uniformly disperses the wetting agent and thermoplastic resin. Suitable, but non-limiting examples of solvents include methanol, ethanol, isopropanol, 1-butanol, benzyl alcohol, furfuryl alcohol, formic acid, phenol, and m-cresol and mixtures of these alcohols with water. Particularly preferred solvents for use in practicing the invention are aqueous mixtures of methanol or ethanol. The amount of alcohol in the aqueous alcohol solution ranges between about 70 wt. % and about 100 wt %, preferably about 90 wt. %.

The surface treating composition of the invention is stable and storable at room temperatures for prolonged periods of time. On standing, the composition may turn cloudy and/or undergo gelation, however this is easily reversible by gentle heating and stirring prior to use.

Thereafter, the surface treating composition are applied to long glass fibers, especially glass rovings, prior to preparation of long fiber-reinforced composites. Any suitable application method may be used in applying the composition to the glass fiber, so long as the application method uniformly wets and coats the glass fibers with the composition. Suitable, but non-limiting, methods of applying the composition include immersing and spraying. It is preferred, however, that the glass fiber be immersed directly into the surface treating composition.

In practicing the invention, commercially available glass fibers are immersed into the treating composition at a temperature ranging between about 25° C. and about 60° C., preferably about 50° C., for a period ranging between about 2 seconds and about 15 seconds, preferably about 5 seconds.

Thereafter, the treated glass fibers are dried at a temperature ranging between about 100° C. and about 350° C., preferably about 250° C., for a period ranging between about 6 seconds and about 45 seconds, preferably about 15° C. The drying process may be conducted in any suitable apparatus such as an oven.

The amount of the treating composition applied to the glass fiber may be any suitable amount which effectively results in good structural strength of the finished glass fiber thermoplastic composite, good fiber integrity and handleability. A suitable amount of treating composition is between about 3 and about 20 wt. % of solids to total weight of the treated glass fiber. A preferred range is between about 5 and about 18 wt. % which provides good fiber integrity and handleability and binding with resin, e.g. polyamide.

If desired, the treating composition may be applied to glass fiber by the known methods of fiber formation and sizing application. Representative of a method of fiber formation and sizing application is the process described by U.S. Pat. No. 2,133,238. According to this method, glass fiber strands are composed of a multitude of fine glass filaments which are formed by drawing at a high rate of speed from molten cones of glass located at the tips of small orifices in a bushing. During formation, the filaments are coated with the surface treating composition of the present invention. Coating of the filaments takes place while they are moving at a speed of about 1,000 to 20,000 feet per minute. The coating is accomplished in the immediate vicinity of the hot bushings and the furnace in which the glass is melted. After coating, the glass fiber strands move a short distance onto a collecting means, sized, and dried to drive off residual moisture from the treated glass.

The treated glass fibers are useful in reinforcing many types of resins including Nylon resin (e,g, Nylon-6 and Nylon-6,6) and polyester resin (e.g. PC, PET, and PBT) and its plastic alloys (e.g. PC/PET, PC/PBT, PET/PBT).

The ratio of the resin to the pretreated glass fiber in a glass reinforced thermoplastic composite may be any suitable ratio that imparts the desired properties to the finished article. Generally a ratio ranging between about 10 and about 50 wt. % glass, based on the total weight of the composite, is suitable. A preferred amount ranges between about 30 and about 50 wt. % glass in the molded article. This provides a good balance between cost and structural strength.

Treatment of glass fibers with the surface treating compositions of the present invention resolves problems related to the fiber wetting properties and fiber dispersing property, and results in the improvement in mechanical properties of long fiber reinforced thermoplastics containing the pretreated glass fiber. Treatment of commercially available glass rovings with the inventive surface treating compositions produces long fiber reinforced thermoplastics having good mechanical properties and uniform fiber dispersion.

The following Examples 1–8 illustrate the effectiveness of treating glass fibers with the surface treating compositions of present invention, but do not serve to limit the scope of the present invention. The physical properties of polyamides used in for the preparation of the organic wetting agents are summarized in Table 1 below.

TABLE 1

|  | Polyamide | | | |
| --- | --- | --- | --- | --- |
|  | A | B | C | D |
| Melting point range (C.°) | 105–125 | 147–162 | 147–162 | 145–160 |
| Relative viscosity* | 21–29 | 70–100 | 70–90 | 24–36 |
| Specific Gravity (23° C.) | 1.08 | 1.08 | 1.08 | 1.05 |

*8.4 wt. % polyamide in 90% formic acid at 25° C.

These polyamides are blended with amino or carboxylic alkyltrialkoxysilanes, e.g. gamma-aminopropyltriethoxy silane, to form the organic wetting agent. The procedure is described in the '550 patent. A representative synthesis of the organic wetting agent is described in Example 9, infra. The constituents of the surface treating compositions, containing the organic wetting agent, employed in the Examples are described in the Table 2 below.

TABLE 2

| Surface treating composition | Ex. 1 | Ex. 2 | Ex. 3 | Ex. 4 | Ex. 5 | Ex. 6 | Ex. 7 | Ex. 8 | Ex. 3* | Ex. 5* |
| --- | --- | --- | --- | --- | --- | --- | --- | --- | --- | --- |
| Wetting Agent** | A' | B' | B' | B' | C' | B' | D' | C' | B' | C' |
| Wetting Agent (wt. %) | 7.5 | 9 | 13 | 18 | 20 | 18 | 20 | 18 | 18 | 18 |
| Polyamide powder (wt. %) | 4.5 | 0 | 0 | 0 | 0 | 0 | 0 | 0 | 0 | 0 |
| Ethanol (wt. %) | 83.6 | 81.9 | 78.3 | 73.8 | 72 | 73.8 | 72 | 73.8 | 73.8 | 73.8 |
| Water (wt. %) | 4.4 | 9.1 | 8.7 | 8.2 | 8 | 8.2 | 8 | 8.2 | 8.2 | 8.2 |

*Comparative example
**Thermoplastic silanated polyamide prepared from the corresponding polyamides A, B, C, or D.

EXAMPLE 1

This Example compares the mechanical and fiber dispersing properties of long fiber-reinforced resin composites containing untreated glass rovings (Comparative Example 1) or glass rovings treated with a composition containing Wetting Agent A' and thermoplastic polymer powder (Example 1).

A bath containing the treating composition of Example 1 was prepared by mixing 7.5 wt. % Wetting Agent A' and 4.5 wt. % Nylon-6 powder (1 micron particle size) in aqueous ethanol containing 83.6 wt. % ethanol and 4.4 wt. % water at 60° C. for 14 minutes. The components of this surface treating composition, as well as compositions used in Examples 2–8, are shown in Table 2.

The glass fiber rovings were then immersed into the bath (50° C.) for 5 seconds, and dried in a oven (250° C.) for about 15 seconds.

Untreated and treated glass rovings were independently impregnated with Nylon-6 resin, in amounts shown in Table 2, and extruded. The compositions was cut into 10 mm LFRTP pellets. After drying, the pellets were made into test specimens by injection molding. The mechanical and fiber dispersing properties of the test specimens were evaluated according to American Society for Testing and Materials (ASTM) tests and the results are shown in Table 3.

TABLE 3

| COMPONENT & CHARACTERISTICS | COMPARATIVE EXAMPLE 1 | EXAMPLE 1 |
| --- | --- | --- |
| Type of Resin | Nylon-6 | Nylon-6 |
| Fiberglass Content (wt. %) | 41.2 | 38.2 |
| Tensile Strength (kgf/cm$^2$) | 1390 | 1880 |
| Flexural Strength (kgf/cm$^2$) | 2020 | 2440 |
| Flexural Modulus (kgf/cm$^2$) | $8.9 \times 10^4$ | $9.2 \times 10^4$ |
| Impact Strength (ft-lb/in-V) | 4.80 | 4.70 |
| Heat Deflection Temperature (°C.) | 218 | 222 |
| Fiber Wetted Property | Poor | Good |
| Fiber Dispersing Property After Injection of Pellets | Poor | Good |

EXAMPLE 2–4

This Example compares the mechanical and fiber dispersing properties of long fiber-reinforced resin composites containing untreated glass rovings (Comparative Example 1) or glass rovings treated with a composition containing 9 wt. % (Example 2), 13 wt. % (Example 3), and 18 wt. % (Example 4) Wetting Agent B' as summarized in Table 2.

Separate baths containing the treating composition of Examples 2–4 were prepared by mixing different amounts of Wetting Agent B', in amounts shown in Table 2, in an aqueous ethanol solution. The glass fiber rovings used in preparing Examples 2–4 composites were independently treated by immersion into separate baths (55° C.) for 5 seconds, and dried in a oven (270° C.) for 15 seconds.

The changing states of the dried fiber surfaces after treatment with the surface-treating compositions were examined under a scanning electronic microscope (SEM). It was found that treatment of commercially used fiber surfaces with surface treating compositions having wetting agents increased the wetting properties of the fiber/resin interface. In contrast, an untreated fiber surface was found to be very smooth and did not exhibit good wetting characteristics.

After the glass rovings have been treated with the surface-treating compositions, they were independently impregnated with Nylon-6 resin and extruded. The compositions were cut into 10 mm long fiber reinforced thermoplastic pellets. After drying, the pellets were made into test specimens by injection molding. The mechanical and fiber dispersing properties of the test specimens were evaluated according to ASTM tests and the results are shown in Table 4.

TABLE 4

| COMPONENT & CHARACTERISTICS | COMPARATIVE EXAMPLE 1 | EXAMPLE 2[a] | EXAMPLE 3[b] | EXAMPLE 4[c] |
| --- | --- | --- | --- | --- |
| Type of Resin | Nylon-6 | Nylon-6 | Nylon-6 | Nylon-6 |

TABLE 4-continued

| COMPONENT & CHARACTERISTICS | COMPARATIVE EXAMPLE 1 | EXAMPLE 2[a] | EXAMPLE 3[b] | EXAMPLE 4[c] |
|---|---|---|---|---|
| Fiberglass Content (wt. %) | 41.2 | 40.2 | 40.0 | 40.0 |
| Tensile Strength (kgf/cm$^2$) | 1390 | 1690 | 1900 | 1900 |
| Flexural Strength (kgf/cm$^2$) | 2020 | 2405 | 2640 | 2620 |
| Flexural Modulus (kgf/cm$^2$) | 8.9 × 10$^4$ | 9.2 × 10$^4$ | 11.2 × 10$^4$ | 10.5 × 10$^4$ |
| Impact Strength (ft-lb/in-V) | 4.80 | 5.10 | 5.3 | 5.2 |
| Heat Deflection Temperature (°C.) | 218 | 221 | 220 | 218 |
| Fiber Wetted Property | Poor | Good | Good | Good |
| Fiber Dispersing Property After Injection of Pellets | Poor | Poor | Good | Good |

[a]The surface treating composition was prepared with a solvent mixture of 81.9 wt. % ethanol and 9.1 wt. % water at a temperature of 60° C. for 15 minutes.
[b]The surface treating composition was prepared with a solvent mixture of 78.3 wt. % ethanol and 8.7 wt. % water at a temperature of 60° C. for 28 minutes.
[c]The surface treating composition was prepared with a solvent mixture of 73.8 wt. % ethanol and 8.2 wt. % water at a temperature of 60° C. for 45 minutes.

The fiber dispersing properties of ASTM test specimens of long fiber reinforced thermoplastic pellets after injection molding were compared. Glass fibers pretreated with 18 wt. % wetting Agent B' or 13 wt. % wetting Agent B' were uniformly dispersed, after injection molding, in long fiber reinforced thermoplastic pellets made by cross-head die. The pellets did not show evidence of any non-uniform dispersion. Moreover, pretreatment of glass fibers with only 9 wt. % wetting agent B' showed that fiber dispersion was greatly improved in comparison with composites containing untreated glass fibers.

The surface-treating composition of the present invention resolved the problems of enhancing the wetting and dispersibility properties of long glass fibers in the manufacture of long fiber reinforced thermoplastic composite material.

EXAMPLE 5

This Example compares the mechanical and fiber dispersing properties of long fiber-reinforced resin composites containing untreated glass rovings (Comparative Example 2) or glass rovings pretreated with a composition containing 20 wt. % Wetting Agent C' (Example 5).

A bath containing the treating composition of Example 5 (Table 2) was prepared by mixing 20 wt. % Wetting Agent C' in aqueous ethanol containing 72 wt. % ethanol and 8 wt. % water at 60° C. for one hour. Thereafter, the glass fiber rovings were immersed into the bath (55° C.) for 5 seconds, and dried in a oven (280° C.) for 15 seconds.

Thereafter, untreated and treated glass rovings were independently impregnated with Nylon-6/6 resin, in amounts shown in Table 5, and extruded. The compositions were cut into 10 mm long fiber reinforced Nylon-6/6 pellets. After drying, the pellets were made into test specimens by injection molding. The mechanical and fiber dispersing properties of the test specimens were evaluated according to ASTM tests and the results are shown in Table 5.

TABLE 5

| COMPONENT & CHARACTERISTICS | COMPARATIVE EXAMPLE 2 | EXAMPLE 5 |
|---|---|---|
| Type of Resin | Nylon-6/6 | Nylon-6/6 |
| Fiberglass Content (wt. %) | 39.61 | 40.0 |
| Tensile Strength (kgf/cm$^2$) | 1700 | 1900 |
| Flexural Strength (kgf/cm$^2$) | 2440 | 2530 |
| Flexural Modulus (kgf/cm$^2$) | 9.4 × 10$^4$ | 10.8 × 10$^4$ |
| Impact Strength (ft-lb/in-V) | 4.5 | 4.0 |
| Heat Deflection Temperature (°C.) | 215 | 236 |
| Fiber Wetted Property | Poor | Good |
| Fiber Dispersing Property After Injection of Pellets | Poor | Good |

EXAMPLE 6

This Example compares the mechanical and fiber dispersing properties of long fiber-reinforced resin composites containing glass rovings treated with a composition containing 18 wt. % Wetting Agent B'. Comparative Example 3 composite contained 30.5 wt. % of pretreated glass rovings, while Example 6 composite contained 30 wt. % of pretreated glass rovings after diluting a composite containing 86 wt. % pretreated glass rovings with resin. The components of the treating composition are summarized in Table 2.

A bath containing a surface treating composition was prepared by mixing 18 wt. % Wetting Agent B' in aqueous ethanol containing 73.8 wt. % ethanol and 8.2 wt. % water at 60° C. for 45 minutes. The glass fiber rovings were then immersed into the bath (55° C.) for 5 seconds, and dried in a oven (270° C.) for 15 seconds.

Thereafter, the treated rovings were made into 30.5 wt. % fiber of long fiber reinforced thermoplastic pellets (comparative Example 3) test specimens by injection molding. To prepare Example 6 composite, the treated fiber rovings were initially made into 86 wt. % fiber of long-fiber reinforced thermoplastic pellets. The glass fiber content the 86 wt. % composite was then adjusted to 30 wt. % of fiber with Nylon-6 resin by dry mixing and test specimens were made by injection molding. The mechanical and fiber dispersing properties of the test specimens were evaluated according to ASTM tests and the results are shown in Table 6.

The SEM photographs of the surfaces of test specimens demonstrate that comparable uniform fiber dispersion effects were obtained by diluting a high glass fiber content long fiber-reinforced thermoplastic pellets to the desired fiber percentage.

TABLE 6

| COMPONENT & CHARACTERISTICS | COMPARATIVE EXAMPLE 3 | EXAMPLE 6 |
|---|---|---|
| Type of Resin | Nylon-6 | Nylon-6 |
| Fiberglass Content (wt. %) | 30.5 | 30 |
| Tensile Strength (kgf/cm$^2$) | 1550 | 1500 |
| Flexural Strength (kgf/cm$^2$) | 2070 | 2055 |
| Flexural Modulus (kgf/cm$^2$) | 8.2 × 10$^4$ | 7.1 × 10$^4$ |
| Impact Strength (ft-lb/in-V) | 4.30 | 4.2 |
| Heat Deflection Temperature (°C.) | 219 | 220 |
| Fiber Wetted Property | Good | Good |
| Fiber Dispersing Property After Injection of Pellets | Good | Good |

EXAMPLE 7

This Example compares the mechanical and fiber dispersing properties of long fiber-reinforced resin composites containing untreated glass rovings (Comparative Example 4) or glass rovings pretreated with a composition containing 20 wt. % Wetting Agent D' (Example 7). The components of the treating compositions are summarized in Table 2.

A bath containing the treating composition of Example 7 was prepared by mixing 20 wt. % Wetting Agent D' in aqueous ethanol containing 72 wt. % ethanol and 8 wt. % water at 60° C. for one hour. Thereafter, the glass fiber rovings were immersed into the bath (55° C.) for 5 seconds, and dried in a oven (270° C.) for 15 seconds.

Thereafter, untreated and treated glass rovings were independently impregnated with a polycarbonate (pc) resin, Lexan 131 (General Electric Co.), in amounts shown in Table 7, and extruded. The compositions were cut into 10 mm LFRTP pellets, dried, and made into test specimens by injection molding. The mechanical and fiber dispersing properties of the test specimens were evaluated according to ASTM tests and the results are shown in Table 7.

TABLE 7

| COMPONENT & CHARACTERISTICS | COMPARATIVE EXAMPLE 4 | EXAMPLE 7 |
|---|---|---|
| Type of Resin | pc | pc |
| Fiber Content (wt. %) | 34.14 | 34.83 |
| Tensile Strength (kgf/cm$^2$) | 1070 | 1280 |
| Flexural Strength (kgf/cm$^2$) | 1630 | 1770 |
| Flexural Modulus (kgf/cm$^2$) | 9.4 × 10$^4$ | 9.2 × 10$^4$ |
| Impact Strength (ft-lb/in-V) | 4.6 | 4.8 |
| Heat Deflection Temperature (°C.) | 145 | 142 |
| Fiber Wetted Property | Poor | Good |
| Fiber Dispersing Property After Injection of Pellets | Poor | Good |

Example 8

This Example compares the mechanical and fiber dispersing properties of long fiber-reinforced resin composites containing glass rovings treated with a composition containing 18 wt. % Wetting Agent C' (Comparative Example 5) or glass rovings pretreated with the same treating composition but further containing, as additives, a processing aid agent, a heat stabilizer and an anti-oxidant (Example 8).

A bath containing the treating composition of Example 8 was prepared by mixing 18 wt. % Wetting Agent C', 0.5 wt. % A-C ® 540A (processing aid), 0.2 wt. % NECKAR ® 11 (a heat stabilizer), and IRGANOX ®1010 (anti-oxidant) in aqueous ethanol containing 73.8 wt. % ethanol and 8.2 wt. % water at 60° C. for 45 minutes. Comparative Example 5 treating solution was prepared in the same manner as Example 8 except no processing aid, heat stabilizer, or anti-oxidant additives were included.

Thereafter, the glass fiber rovings were immersed into separate baths containing the treating compositions (55° C.) for 5 seconds, and dried in a oven (270° C.) for 15 seconds.

The treated glass rovings were independently impregnated with Nylon-6/6 resin, in amounts shown in Table 8, and extruded. The compositions were cut into 10 mm long fiber reinforced Nylon-6/6 pellets. After drying, the pellets were made into test specimens by injection molding. The mechanical and fiber dispersing properties of the test specimens were evaluated according to ASTM tests and the results are shown in Table 8.

Table 8 shows that the addition of wetting agent, heat stabilizer and anti-oxidant in the treatment solution does not effect the mechanical or fiber dispersing properties of long fiber reinforced thermoplastic pellets.

TABLE 8

| COMPONENT & CHARACTERISTICS | COMPARATIVE EXAMPLE 5 | EXAMPLE 8 |
|---|---|---|
| Type of Resin | Nylon-6/6 | Nylon-6/6 |
| Processing Aid Agent | — | 0.5 |
| Heat Stabilizer | — | 0.2 |
| Anti-Oxidant | — | 0.15 |
| Fiberglass Content (wt. %) | 40 | 39.5 |
| Tensile Strength (kgf/cm$^2$) | 1900 | 1900 |
| Flexural Strength (kgf/cm$^2$) | 2530 | 2520 |
| Flexural Modulus (kgf/cm$^2$) | 10.8 × 10$^4$ | 10.2 × 10$^4$ |
| Impact Strength (ft-lb/in-V) | 4.0 | 4.0 |
| Heat Deflection Temperature (°C.) | 236 | 236 |
| Fiber Wetted Property | Good | Good |
| Fiber Dispersing Property After Injection of Pellets | Good | Good |

EXAMPLE 9

A surface treating composition is prepared as follows: a Nylon polymer composed of 48.6 mole % caprolactam, 14.1 mole % hexamethylene adipamide, and 37.3 mole % hexamethylene sebacamide, which is soluble in hot ethanol and had a crystalline melting point of about 128° C. and melting index of 4.2, is blended on a rubber mill with 0.93 wt. % gammaaminopropyltriethoxy silane for ten minutes at 150° C. to produce a silanated terpolymer having a melt index of 2.6 as a wetting agent.

The wetting agent (7.5 wt. %) and Nylon-6 resin (4.5 wt. %) are mixed in aqueous ethanol containing 72 wt. % ethanol and 8 wt. % water at 60° C. for one hour. Thereafter, the glass fiber rovings are immersed into the bath (55° C.) for 5 seconds, and dried in a oven (270° C.) for 15 seconds.

Untreated and treated glass rovings are independently impregnated with Nylon-6 resin, in amounts shown in Table 3 (Example 1), and extruded. The compositions are cut into 10 mm long fiber reinforced Nylon-6 pellets. After drying, the pellets are made into test specimens by injection molding. The mechanical and fiber dispersing properties of the test specimens are evaluated according to ASTM tests.

Test specimens containing the treated glass fibers are found to have superior mechanical and fiber dispersing properties relative to test specimens having untreated glass fibers.

What is claimed is:

1. A composition for treating long glass fibers used for reinforcing thermoplastic polymers comprising:
   (a) a wetting agent in an amount ranging between about 3 and about 40 wt. %, said wetting agent selected from the group consisting of:

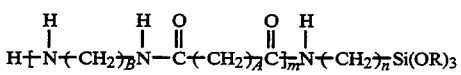

and

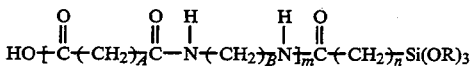

wherein A=4–12; B=2–10; n=2–6; m=20–40; and R=CH$_3$ or C$_2$H$_5$; and (b) a thermoplastic resin in an amount ranging between about 1 and about 40 wt. %, said thermoplastic resin is selected from the group consisting of polyamide polymers, polyamide copolymers, polyalkylcarbonate polymers, polyalkylcarbonate copolymers, and mixtures thereof.

2. The composition of claim 1, wherein said wetting agent ranges between about 5 and about 20 wt. %.

3. The composition of claim 1, wherein said thermoplastic resin ranges between about 5 and about 25 wt. %.

4. A method for treating a glass fiber for reinforcing thermoplastic polymers comprising:
(a) exposing said glass fiber to a composition comprising:
(i) a wetting agent in an amount ranging between about 3 and about 40 wt. %, said wetting agent selected from the group consisting of:

and

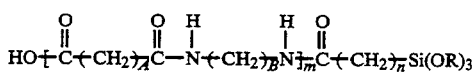

wherein $A=4-12$; $B=2-10$; $n=2-6$; $m=20-40$; and $R=CH_3$ or $C_2H_5$; and (ii) a thermoplastic resin in an amount ranging between about 1 and about 40 wt. %, said thermoplastic resin is selected from the group consisting of polyamide polymers, polyamide copolymers, polyalkylcarbonate polymers, polyalkylcarbonate copolymers, and mixtures thereof; and (b) drying said exposed glass fiber.

5. The method according to claim 4, wherein said wetting agent is present in an amount ranging between about 5 and about 20 wt. %.

6. The method according to claim 4, wherein said thermoplastic resin is present in an amount ranging between about 5 and about 25 wt. %.

7. A method for making a long glass fiber reinforced thermoplastic composite article comprising:
(a) exposing said long glass fiber to a composition comprising:
(i) a wetting agent in an amount ranging between about 1 and about 40 wt. %, said wetting agent selected from the group consisting of:

and

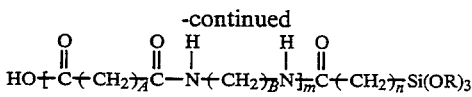

wherein $A=4-12$; $B=2-10$; $n=2-6$; $m=20-40$; and $R=CH_3$ or $C_2H_5$; and (ii) a thermoplastic resin in an amount ranging between about 1 and about 40 wt. %, said thermoplastic resin is selected from the group consisting of polyamide polymers, polyamide copolymers, polyalkylcarbonate polymers, polyalkylcarbonate copolymers, and mixtures thereof;

(b) drying said exposed glass fiber;

(c) impregnating said dried glass fiber with a thermoplastic polymer; and (d) extruding said impregnated glass fiber so as to form said long fiber-reinforced thermoplastic article.

8. The method according to claim 7, wherein said wetting agent is present in an amount ranging between about 5 and about 20 wt. %.

9. The method according to claim 8, wherein said thermoplastic resin is present in an amount ranging between about 5 and about 25 wt. %.

10. The method according to claim 8, wherein said long glass fiber is a roving.

11. A glass fiber containing a dried residue of the composition of claim 1.

12. The glass fiber of claim 11, wherein said glass fiber is a roving.

13. A long glass fiber reinforced thermoplastic composite comprising the glass fiber of claim 12 and a thermoplastic polymer.

14. The long glass fiber reinforced thermoplastic composite of claim 13, wherein said glass fiber is present in an amount ranging between about 10 and about 50 wt. % and said thermoplastic polymer is present in an amount ranging between about 30 and about 50 wt. %.

15. The composition of claim 1, wherein said thermoplastic resin is selected from the group consisting of:

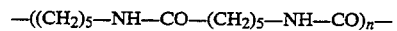

and

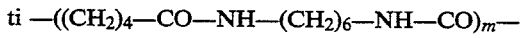

wherein n and $m=130$ to 220.

16. The method according to claim 4, wherein said thermoplastic resin is selected from the group consisting of:

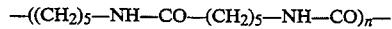

and

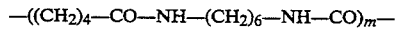

wherein n and $m=130$ to 220.

* * * * *

UNITED STATES PATENT AND TRADEMARK OFFICE
CERTIFICATE OF CORRECTION

PATENT NO. : 5,405,895
DATED : April 11, 1995
INVENTOR(S) : Jeng-Yue WU et al.

It is certified that error appears in the above-indentified patent and that said Letters Patent is hereby corrected as shown below:

Title page, [75] Inventors: change "Prov. of China" to --Republic of China--;

[73] Assignee: after "Hsinchu" add --Taiwan, Republic of China--.

Signed and Sealed this

Eleventh Day of July, 1995

Attest:

BRUCE LEHMAN

*Attesting Officer*  *Commissioner of Patents and Trademarks*